United States Patent
Kretz et al.

(10) Patent No.: US 7,548,283 B2
(45) Date of Patent: Jun. 16, 2009

(54) ACTIVE MATRIX STRUCTURE FOR DISPLAY SCREEN AND SCREEN COMPRISING ONE SUCH MATRIX

(75) Inventors: Thierry Kretz, Saint Jean de Moirans (FR); Hugues Lebrun, Coublevie (FR)

(73) Assignee: Thales, Neuilly-sur-Seine (FR)

( * ) Notice: Subject to any disclaimer, the term of this patent is extended or adjusted under 35 U.S.C. 154(b) by 541 days.

(21) Appl. No.: 10/537,348

(22) PCT Filed: Dec. 2, 2003

(86) PCT No.: PCT/EP03/50918

§ 371 (c)(1),
(2), (4) Date: Jan. 4, 2006

(87) PCT Pub. No.: WO2004/051356

PCT Pub. Date: Jun. 17, 2004

(65) Prior Publication Data

US 2006/0146209 A1    Jul. 6, 2006

(30) Foreign Application Priority Data

Dec. 3, 2002 (FR) .................................. 02 15484

(51) Int. Cl.
G02F 1/1343    (2006.01)

(52) U.S. Cl. .............................. 349/39; 349/43; 349/38
(58) Field of Classification Search .................. 349/39, 349/38

See application file for complete search history.

(56) References Cited

U.S. PATENT DOCUMENTS

| | | |
|---|---|---|
| 4,961,630 A | 10/1990 | Baron et al. |
| 5,286,983 A | 2/1994 | Sakamoto et al. |
| 5,835,170 A | 11/1998 | Fujiwara et al. |
| 2006/0146209 A1 | 7/2006 | Kretz et al. |

OTHER PUBLICATIONS

Takashi Sugawara et al., "Liquid-crystal 1.8-in displays using poly-Si thin-film transistors with novel structure and a storage-capacitance arrangement", Optical Engineering, vol. 33, No. 11, pp. 3683-3688, Nov. 1, 1994.
U.S. Appl. No. 12/066,327, filed Mar. 10, 2008, Kretz.
U.S. Appl. No. 12/049,747, filed Mar. 17, 2008, Kretz et al.

*Primary Examiner*—Richard H Kim
(74) *Attorney, Agent, or Firm*—Oblon, Spivak, McClelland, Maier & Neustadt, P.C.

(57) ABSTRACT

An active matrix structure for display screen includes a storage capacitor bus disposed under each row of pixel electrodes, produced in a transparent conducting material, and disposed in the structure on a level separated from a level of the row selection lines and a level of the pixel electrodes by an insulation layer at least. The storage bus of a row is driven by a selection line of a previous row.

18 Claims, 8 Drawing Sheets

(Transverse section along [II'])

ACTIVE MATRIX STRUCTURE FOR DISPLAY SCREEN AND SCREEN COMPRISING ONE SUCH MATRIX

BACKGROUND OF THE INVENTION

1. Field of the Invention

The present invention pertains to matrix display screens, and more particularly to an active matrix structure of pixel elements offering both large storage capacity on each pixel electrode and a high aperture ratio. The field of the invention is that of active matrices formed on a transparent substrate.

2. Discussion of the Background

A matrix display screen is customarily formed of two transparent substrates, for example made of glass, facing one another, joined together by a peripheral seal so as to allow a cavity in which is located the display material such as liquid crystals or light-emitting diodes made of organic material (OLEDs as they are known). The first substrate is clad with a back electrode, common to the whole matrix, linked to a reference potential. In the case of a color screen, this substrate furthermore comprises a matrix of colored filters (typically, red, green and blue filters). The second substrate comprises the pixel electrodes, arranged in matrix fashion in rows and columns. In the case of active matrices, the second substrate also comprises switching devices such as a transistor or a diode, with a device for each pixel electrode. Each switching device is connected to a row and to a column of the matrix through which a display data item may be applied selectively (matrix addressing) to the corresponding pixel electrode.

The structure formed by the pixel element, the portion of back electrode opposite and the dielectric between, defines a pixel capacitor. This pixel capacitor has a small capacitance. For this reason, a separate storage capacitor is provided in the structure, associated with each pixel electrode, so as to maintain the voltage level applied to the pixel electrode by the associated switching device, the whole time of each scan frame. According to the voltage level applied to the pixel electrode, with respect to the reference level of the back electrode, a white (or green, red or blue, in the case of a screen with color filters) image dot or a black image dot is obtained at the corresponding location on the screen.

The refreshing of the images on the screen is obtained according to a frame scan mode: the rows of pixel elements are selected in turn by means of a scan signal applied successively to each of the lines for selecting rows of the matrix and the display data corresponding to each row are applied to the columns. The application of the frame scan signal to a line has the effect of turning on the switching devices of the associated row. Each of these devices then switches the display data item applied to the associated column, typically a voltage level, onto the associated pixel electrode. The voltage level on the pixel electrode must be maintained without losses, the whole time of the frame. Now, the leakage currents of transistors in the off state, and the stray capacitances with the lines and the columns are so many factors that bring about a discharge of the pixel capacitor. It has been seen that a separate storage capacitor with a suitable value was thus provided, associated with the pixel electrode, for this function, with the aim of obtaining as good as possible an image contrast and of reducing the phenomena of flicker.

According to a state of the art as described for example in the article entitled "Driving method for gate-delay compensation of TFT/LCD" by K. Kusafuka, H. Schimizu, S. Kimura, published in IBM J. Res. Develop. Vol. 42 No. 3/4 May/July 1998, a storage capacitor is customarily produced between the pixel electrode and the selection line of the previous row of pixels. In a matrix with switching elements of transistor type, the selection line produces the gate of the transistors of the row, hence the name "gate storage capacitor" (or capacitor on gate as it is known in the literature), for this storage capacitor produced with this selection line. However, with such storage capacitor structures, the metal of the selection line, which metal is opaque, encroaches onto the surface of the pixel electrode. This have the effect of decreasing the aperture ratio OAR of the pixels (open aperture ratio). In practice, a compromise must be made between the storage capacitor value that one seeks to obtain and the degradation of the aperture ratio of the pixel elements that would be acceptable. This solution turns out to be poorly suited for so-called high resolution screens, for which the pixel elements are already of small dimensions.

According to another state of the art, the storage capacitor may be produced by a ground plane buried under the matrix of pixel elements, such as for example described in European patent no. 0 607 352 (92 922674.4). A layer of conducting and transparent material, such as indium tin oxide (ITO) is thus produced over the whole surface of the substrate, preferably above a first layer of conducting or nonconducting opaque material, which forms a screen (light shield). The template of this opaque layer is produced so as to mask all the parts outside the useful aperture zone of the pixels, typically the selection lines and the data lines, so as to screen the field lines of the planar stray capacitances (stray capacitances between the pixel electrode and the lines and the columns).

The structure of the active matrix comprising the switching elements, typically transistors or diodes, and the pixel electrodes, is thereafter produced according to the customary technological processes.

The storage capacitor of each pixel element is then produced to 90% by the capacitive structure between the pixel electrode and the portion of ground plane buried opposite, and to 10% by the portion of selection line of the previous row opposite the pixel electrode.

The buried ground plane is connected to a reference potential, typically the potential of the back electrode, by means of an external contact pad.

For certain applications of active matrix screens, one seeks however to reduce the constraints of external connection. The need to connect the ground plane to a reference potential then appears as a constraint. Specifically, problems of crossover with the other external signals arise, in particular the scanning signals, thereby rendering the design of the installation scheme more complex.

Finally, despite the insulation layers provided in the structure of the matrix (generally three) between the various conducting levels, and according to the fabrication technologies used, in practice short-circuits may occur between the ground plane and the various conducting levels of the structure, due to dust or impurities: short-circuits with the selection lines or the pixel electrode. The pixel electrodes concerned are then short-circuited to the potential of the back electrode: these pixels therefore appear white (or else red, green or blue, in the case of a color screen) These visible defects affect the fabrication yield.

SUMMARY OF THE INVENTION

An object of the invention is to propose a novel matrix structure of display screens which makes it possible to satisfy the image quality criteria despite a reduced size of the pixel elements without adding constraints of external connection and while retaining good optical quality, in particular a high aperture ratio for each pixel.

Another object of the invention is a novel structure of the matrix, through which, in the case of short-circuits of the pixel elements with the storage capacitor, one has by construction an automatic darkening of the image dots concerned.

Another object of the invention is a novel structure of the matrix, through which the short-circuits between the ground plane and the lines are no longer a cause to scrap the matrix.

The basic idea of the invention is to use the principle of the ground plane, that is to say a specialized layer in the structure of the matrix, but structured as wide buses disposed under the rows of pixel electrodes, substantially the same width as these rows, each of these buses being controlled by the selection line of a previous row.

More particularly the matrix structure according to the invention then comprises a layer of a transparent conducting material, disposed in the structure on a level separated from the level of the row selection lines and from the level of the pixel electrodes by an insulation layer at least. The buses are disposed in a manner parallel to the selection lines of the rows, and between these lines, under the rows of pixel electrodes, substantially of the same width as the pixel electrodes. For each pixel element, an optimum storage capacitance is obtained, since the part of the bus opposite each pixel electrode covers substantially the whole surface of this electrode. Each of the buses forming an electrode of the storage capacitor of the pixels of the associated row is driven by a selection line of a previous row. No additional external connection is necessary.

Thus, as claimed the invention relates to an active matrix structure for display screen, formed on a transparent substrate, comprising pixel electrodes disposed in rows and columns, a switching device associated with each electrode, and corresponding row selection lines, each selection line being disposed between two rows of successive pixel electrodes.

According to the invention, this structure comprises under each row of pixel electrodes, a bus made of conducting and transparent material, substantially the same width as said row, produced on a level of the structure separated from the level of the selection lines and from the level of the pixel electrodes by at least one insulation layer and connected to the selection line of a previous row of pixel electrodes, said bus forming a storage capacitor with each pixel electrode of said row.

The conducting material used is generally ITO. The storage bus has a high access resistance. It may be lowered if this layer is doubled, with an opaque layer of titanium, serving as optical mask (light shield), whose sheet resistance is low.

The connection of the storage bus of a row to a previous selection line makes it possible to maintain the charge on the storage capacitor associated with each pixel electrode at a stable reference value, thereby making it possible to ensure the charging of the pixel electrode of the row to the proper video voltage.

This structure applies in particular to active matrices of the type having thin film transistors.

This structure according to the invention allows in particular the use of devices for driving the selection lines via pulse signals having several levels which make it possible to compensate for the various disturbances designated by the term "gate delay", that are related to the stray capacitances of the transistor and to the planar stray capacitances between the pixel electrode and the neighboring columns and rows, including the variations of these couplings as a function of the characteristics of the electrooptical material used (liquid crystals) which vary with the conditions of use, for example with temperature. The abovementioned article "Driving method for gate-delay compensation of TFT/LCD" describes such forms of signals of pulse type, through which the optical qualities are improved. For active matrix structures using transistors as switching devices, a refinement of the invention consists in shaping each of the storage capacitor buses in such a way that they form a second gate for each transistor of the associated row of pixel elements. The storage capacitor bus is then produced on a level of the structure such that this second gate and the main gate of the transistors, which is formed by the row selection lines, lies on either side of the channel of the transistors. A double gate switching transistor structure is thus obtained.

Through this second gate which follows the voltage level of the selection line of the previous row, the turning off of the transistors to the current row is improved: the leakage currents are in particular limited for the whole duration of the frame time which follows the selection of the current row, when the voltage levels have been charged on the pixel electrodes and the associated storage capacitors, thereby helping to improve the maintaining of the charge on the pixel electrodes, and hence, the quality of the image.

According to another aspect of the invention, an additional advantage of gate precharging may also be obtained from this double gate transistor structure according to the invention, by ensuring judicious logic for connecting the storage capacitor buses with the row selection lines, as a function of the mode of addressing of the screen: frame inversion, line inversion, double line.

Thus, with a matrix structure according to the invention comprising a storage capacitor bus under each row of pixel electrodes according to the invention, the matrix fabrication yield, the storage capacitance, and also the driving of the pixels are improved. The optical quality of the screens which use such matrices is thereby improved.

Preferably, the connection of these buses to the associated row selection line is effected outside the active matrix, at at least one end. The connection of the previous line to the two ends of the bus affords the additional advantage of allowing the self-repair of the row selection lines should they be open, due to a fabrication defect. To improve the transmission of the signal, provision may also be made to connect the storage bus to the previous row selection line, at the level of each pixel electrode. One then compensates for the effects of the high access resistance of the storage buses, that is due to the material used, in the case of a line break.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

FIG. 3b is a view in transverse section along an axis II' of FIG. 3a;

DESCRIPTION OF THE PREFERRED EMBODIMENTS

Figure 1:
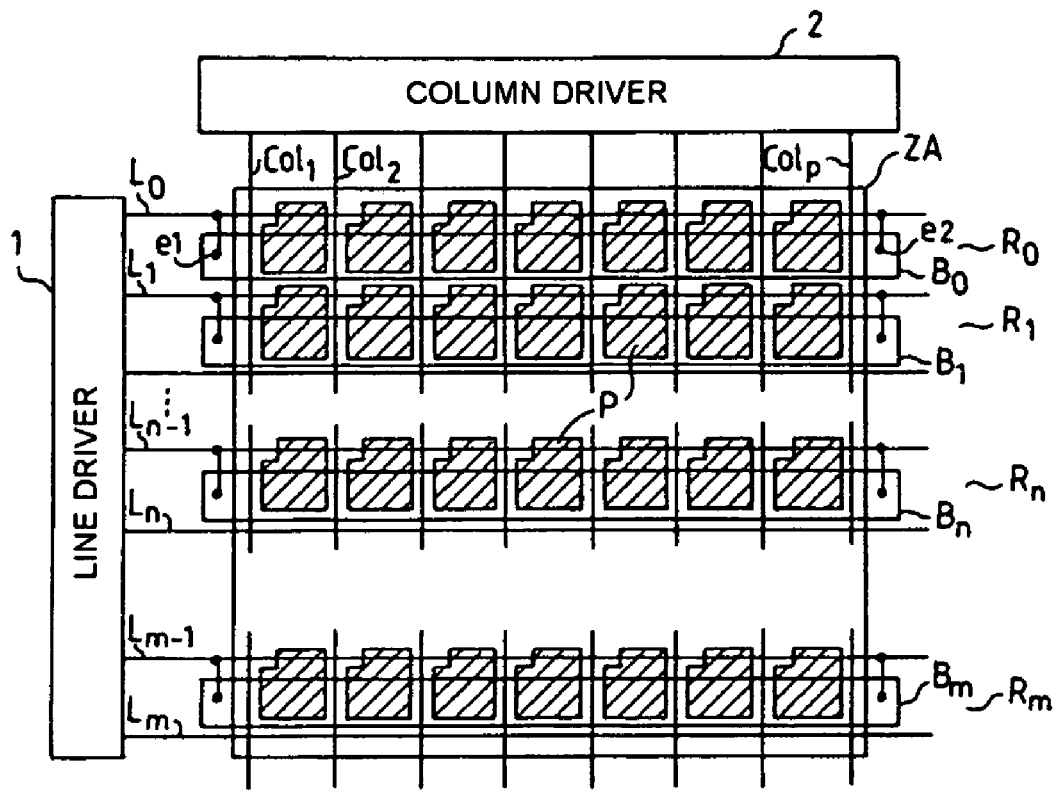
FIG. 1 shows diagrammatically a matrix structure of pixel elements with storage capacitor buses according to the invention.

FIG. 1 diagrammatically represents an active matrix for display screen. Pixel electrodes P are disposed in matrix fashion according to a crossed array of rows $L_1, \ldots L_m$, and columns $Col_1, \ldots Col_p$.

The rows are selected successively, and the corresponding display data transmitted to the pixel electrodes, by means of drive devices (drivers) 1, 2, well known to the person skilled in the art.

Each pixel electrode covers a large part of the surface framed by two successive rows and columns. In the figure, row $R_n$ is framed by the associated selection line $L_n$, and by the selection line $L_{n-1}$ of the immediately preceding row.

According to the invention, for each pixel electrode row, an associated storage capacitor bus $B_n$ is provided under the pixel electrode row, substantially of the same width.

This bus $B_n$ is therefore disposed in parallel, between two selection lines $L_n$ and $L_{n-1}$. It is connected to the selection line $L_{n-1}$ of the previous row. In the example represented, it is connected to this line, outside the active zone of the matrix, ZA, by its two ends.

This bus $B_n$ forms a storage capacitor Cst with each pixel electrode P of the row $R_n$.

An additional row selection line $L_0$ is provided so as to connect the storage capacitor bus $B_1$ of the first row $R_1$ of pixel electrodes of the matrix. Typically, this line receives the same drive signal as the last row $L_m$ of the matrix, by means of suitable connection facilities in the drive device 1.

Figure 2:
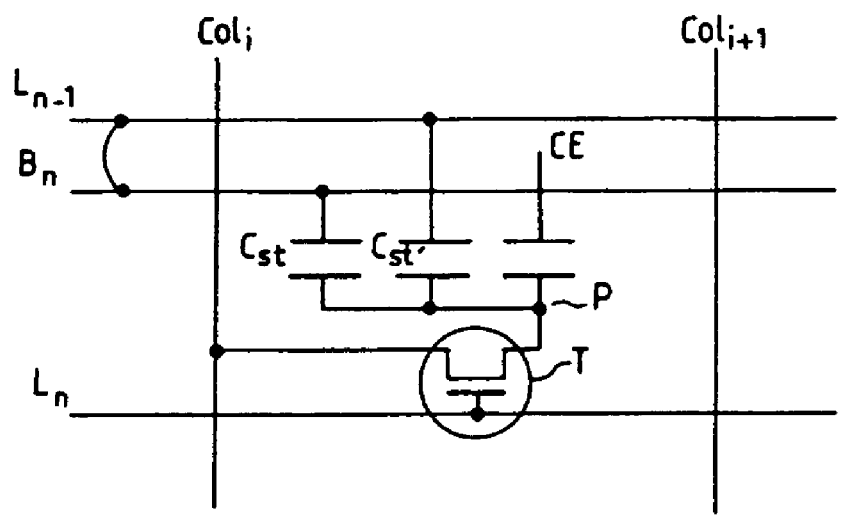
FIG. 2 represents an electrical layout of a corresponding pixel element.

A simplified electrical layout of the pixel element of row $R_n$ and of column $Col_i$ is represented in FIG. 2. In the example, the pixel element comprises a pixel electrode P and a transistor T as switching device.

The transistor T has its gate driven by the row selection line $L_n$, an electrode, typically its source s, connected to the column $Col_i$, and another electrode, typically its drain d, connected to the pixel electrode P. A pixel capacitor $C_{pixel}$ is formed by the stacked structure between the pixel electrode P and the back electrode CE. Between the pixel electrode P and the selection line $L_{n-1}$ of the previous row, there is a storage capacitor Cst, formed by the stacked structure between the bus $B_n$ and the pixel electrode P. In the example, there is another storage capacitor Cst', negligible compared with the first, due to the portion of the pixel electrode P overhanging the selection line $L_{n-1}$ of the previous row, as may be seen in FIG. 1.

Figure 3A:
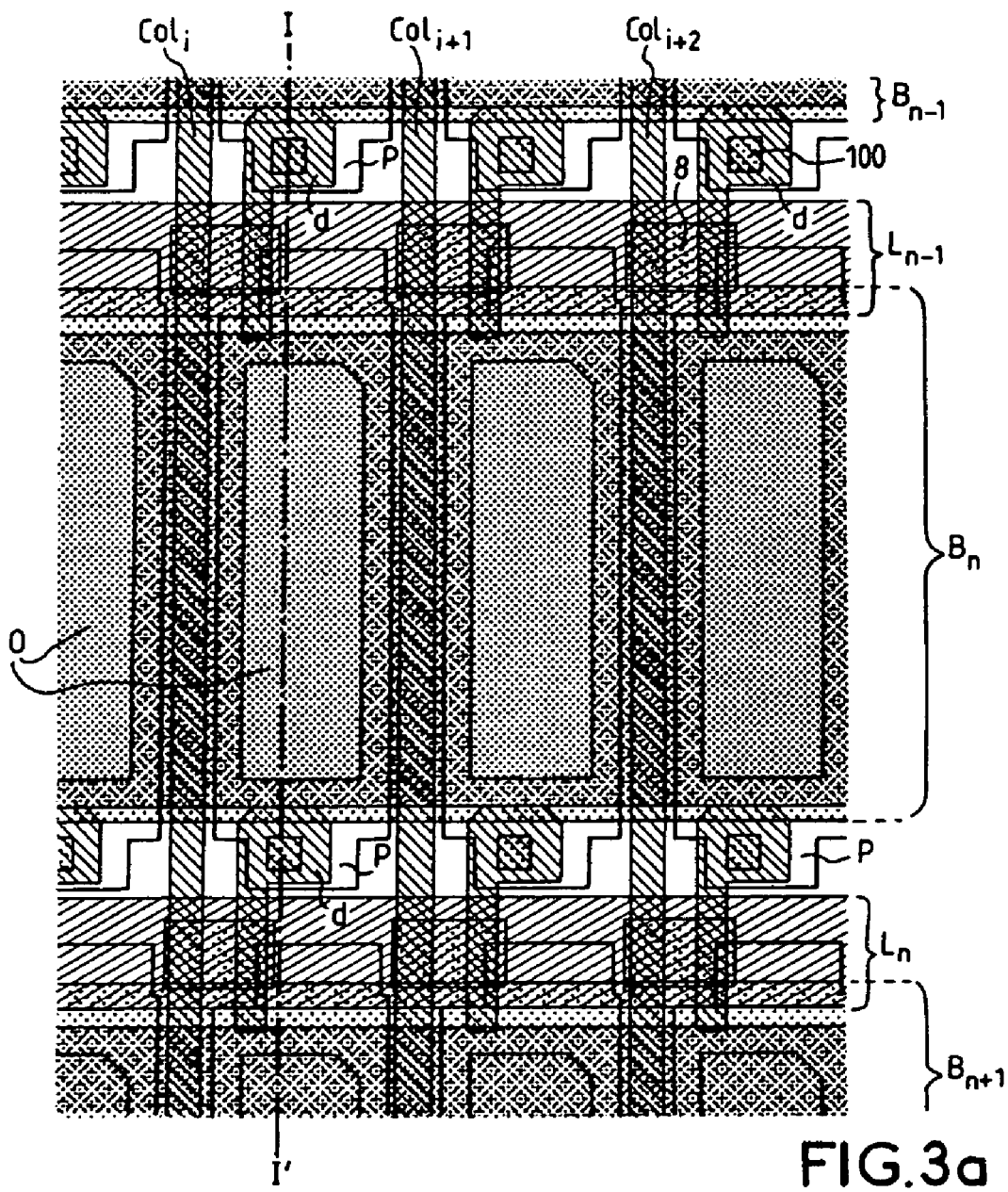
FIG. 3a illustrates an exemplary arrangement of the fabrication layers of a structure of a matrix of pixel elements according to the invention, for a transistor with gate below, as viewed from above.
Figure 3B:
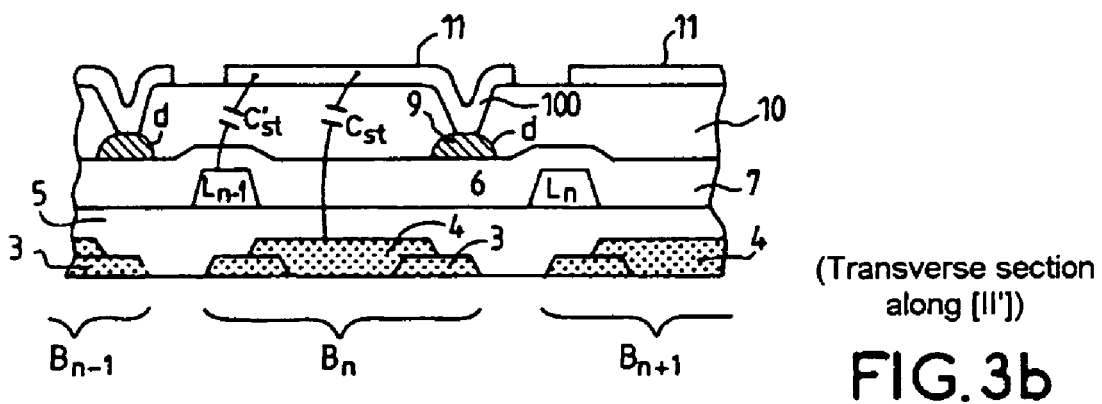

An exemplary practical embodiment of an active matrix structure having thin film transistors, having gate below, with storage capacitor buses according to the invention, is represented in FIGS. 3a and 3b. FIG. 3a shows the arrangement of the various layers of the structure (seen from above). FIG. 3b corresponds to a view in transverse section along the axis II' represented in FIG. 3a.

This exemplary arrangement corresponds to a fabrication process with nine levels of masking.

In a first step, a first deposition of opaque material 3, generally conducting, is made so as to form bands at the location of the rows of pixel electrodes which will be produced on a higher level. In these bands, apertures O are formed at the level of each pixel electrode, which define the useful zone of each pixel (OAR). This first step corresponds to the first level of masking. The opaque material used to form these light shield bands is typically titanium, with a layer thickness of the order of 100 nanometers (nm). One thus has a ring of titanium which makes it possible to mask the leakages of light, in particular leakages due to the defects of orientation of the liquid crystal molecules (due to the electric field or to the topology) at the periphery of each pixel element. The OAR is thus improved.

In a second step, corresponding to the second level of masking, a deposition of conducting and transparent material 4, such as indium tin oxide (ITO, 120 nm thick) is made directly on the first level, so as to form parallel wide bands, at the location of the rows of pixel electrodes which will be produced on a higher level. The storage capacitor buses $B_n$ according to the invention are thus formed, with in this example a structure with double layer 3 and 4. This double layer structure makes it possible, in addition to the OAR gains due to the "light shield" layers 3, to decrease the area resistance of the storage capacitor bus $B_n$. Specifically, if only the ITO layer 4e is used, the area resistance is much higher. The layer of light shield titanium makes it possible to lower this resistance.

Next, an insulation layer, for example $SiO_2$, is deposited over a thickness of 400 nm.

The row selection lines $L_n$, which form the gates of the transistors, are then produced. The conducting material 6 used is typically a titanium-molybdenum double layer (TiMo). As emerges clearly from the figures, each storage bus $B_n$ is framed by two row selection lines (gate metal) $L_n$ and $L_{n-1}$. In the example, the selection line $L_{n-1}$ of the previous row of a row overhangs the storage capacitor bus $B_n$ of the next row $R_n$, so as to facilitate the connection of the bus to this row.

Figure 3C:
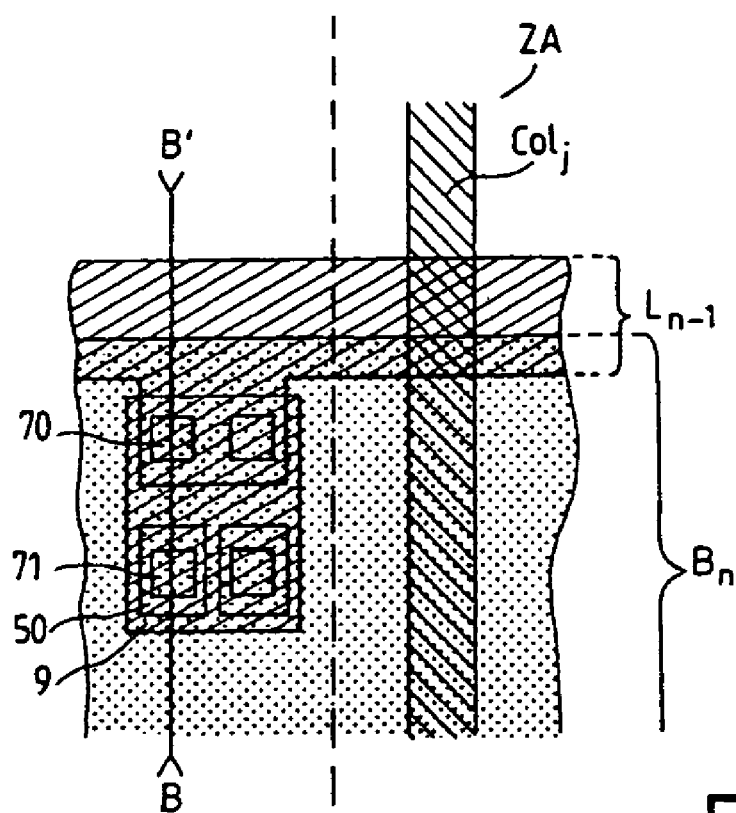
FIGS. 3c and 3d are respectively views from above and in section to illustrate a technique of connecting a storage bus to the previous selection line which can be used in the invention.
Figure 3D:
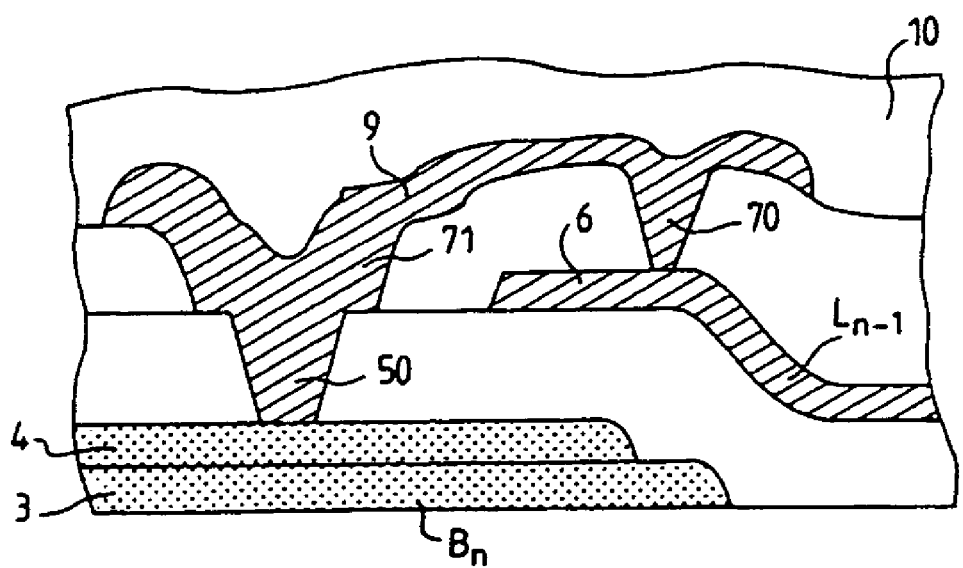

On the fourth level of masking, and as illustrated in FIGS. 3c and 3d, the storage capacitor bus insulation layer 5 is etched to form apertures 50, at the ends, outside the active zone (not represented) with a view to the connection to be produced of the bus to a previous selection line.

Thereafter, in customary fashion, a triple layer is deposited: gate insulator 7 (silicon nitride, 300 nm thick), semiconductor material (intrinsic amorphous silicon for example) and ohmic contact layer (n+ doped amorphous silicon for example). The delimitation of the various levels is then produced so as to form a mesa 8 (FIG. 3a) of semiconductor above each transistor gate. Apertures are produced at this level in the gate insulator: apertures 70 above the selection lines and apertures 71 above the apertures 50 for the resumptions of contact on the storage buses. This is the fifth level of masking.

On the sixth level, and as illustrated in FIGS. 3a and 3b, the conducting layer 9 (molybdenum) is formed, defining the columns and the source and drain electrodes d of the transistors, and the sources and drains are used as masks to create the channel of the transistors.

On the seventh level, a passivation/insulation layer 10, typically silicon nitride, is deposited, and an aperture 100 is produced, above each drain d, so as to allow the direct connection of the pixel electrode 11, typically made of ITO, which is formed on the eighth level.

An additional ninth level is generally provided (not represented) to form a tag made of opaque and insulating material (light blocking layer) to protect the channel of the transistors from light.

As may be seen in the figures, the storage buses are thus produced under the rows of pixel electrodes, substantially with the same width as these rows, and they are framed by two row selection lines, the selection line of the row associated with the bus, and the previous selection line.

Represented in FIG. 3b are the storage capacitors formed between the pixel electrode and the storage capacitor bus (Cst) and between the pixel electrode and the selection line of the previous row (Cst').

FIGS. 3c and 3d illustrate a so-called "knitting" technique for connecting the storage buses with the selection lines. Such a technique is used when the level of insulator between the two layers to be connected is thin, a direct connection then causing overly steep steps, with risks of fracture.

Figure 4A:
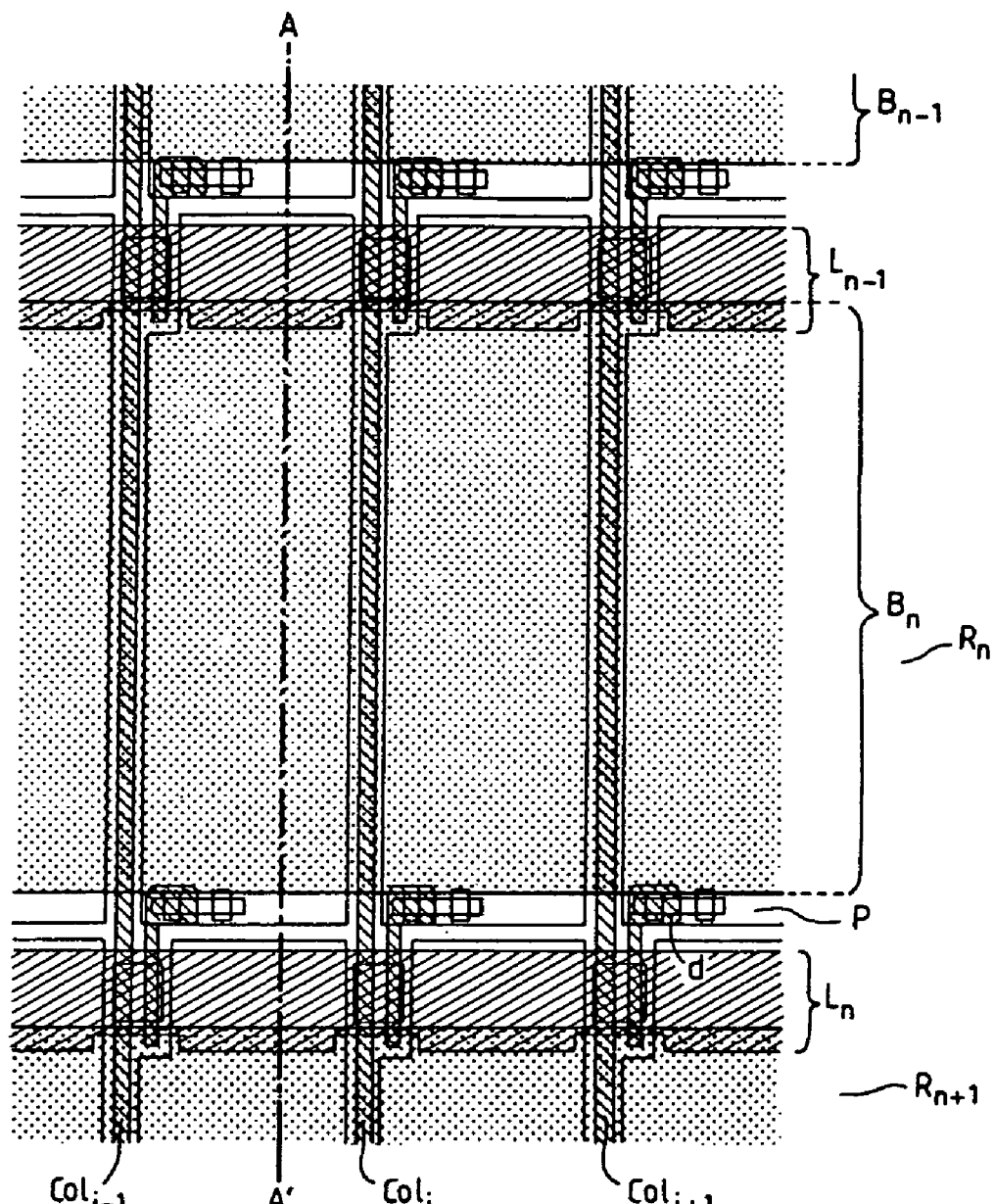
FIG. 4a illustrates another exemplary arrangement of the fabrication layers of a structure of a matrix of pixel elements according to the invention, for a transistor with gate above, viewed from above.
Figure 4B:
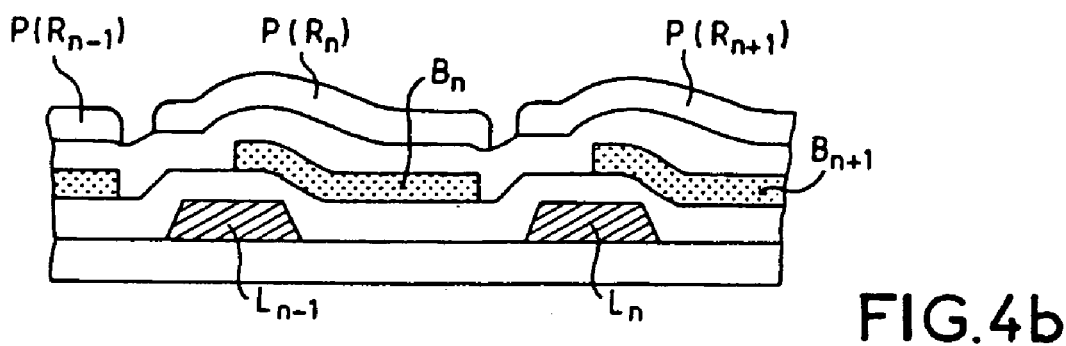
FIG. 4b is a corresponding view in transverse section, along an axis AA'.

Illustrated in FIGS. 4a and 4b is a variant embodiment of a matrix structure with a storage capacitor bus according to the invention, combined with a so-called "shielded pixel" structure.

The storage capacitor bus according to the invention is produced here on a fabrication level situated between the fabrication levels of the transistors and the level of the pixel electrodes, thereby making it possible when the storage bus is at a suitable voltage level, to screen the transverse fields due to the planar stray capacitances. With a storage bus driven by a previous selection line according to the invention, and situated on an intermediate level such as this between the level of the pixel electrodes and the conducting levels of the transistors (rows, columns), the benefit of this screening effect is obtained as long as the selection line is not selected, this being the case for the major part of the time that the frame lasts.

In the example, the thin film transistors are of the type with gate above. In the example, the storage capacitor bus is disposed above the transistor, between the gate level of the transistor of the type with gate above and the level of pixel electrode P. Taking FIG. 4b corresponding to a view in transverse section along the axis AA', the source/drain and channel levels of the transistor which do not appear in this section, are situated under the level of the (gate) selection lines.

According to another aspect of the invention, that may be combined with the various previous embodiments, provision is made for the storage capacitor bus $B_n$ driven by a previous row line $L_{n-1}$, to overhang the selection line $L_n$ of row $R_n$, and to be situated on a matrix structure level situated opposite the gate selection lines with respect to the channel level of the transistors. A transistor structure with double gate is thus obtained, with a main gate connected to the selection line of the row considered, and an auxiliary gate connected to the selection line of the previous row $L_{n-1}$.

Figure 5:
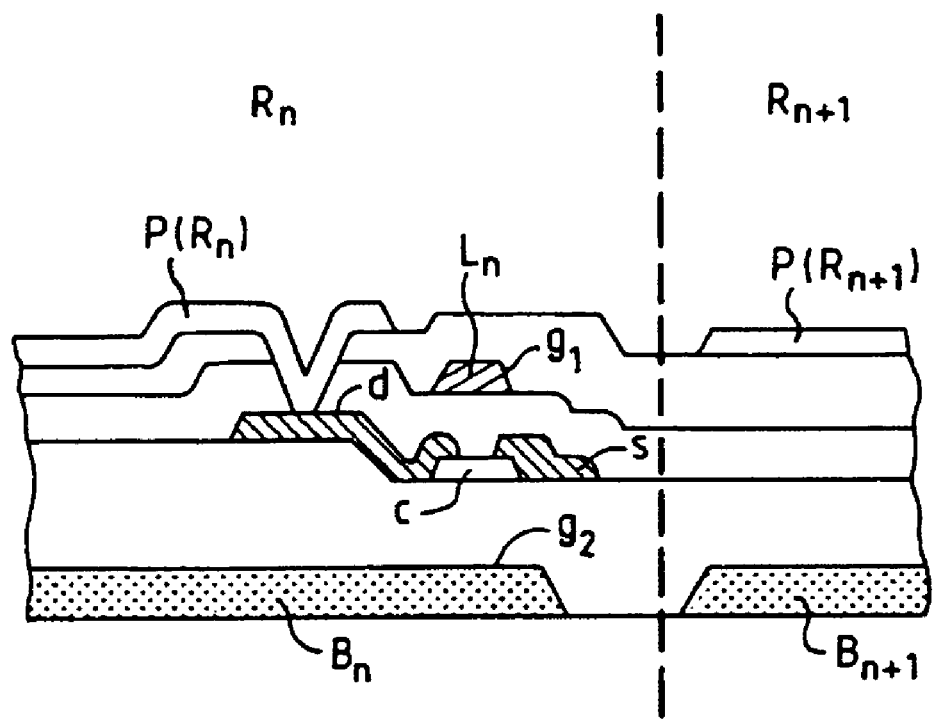
FIGS. 5 and 6 each represent a view in section of a matrix structure in which the storage bus according to the invention is shaped in such a way as to form a second gate of transistors.

A corresponding structure of switching transistor and its associated pixel electrode P in a row $R_n$ of the matrix is illustrated in FIG. 5, in an example of a transistor with gate above. The exemplary transistor embodying a second gate of the transistors T of a row has a main gate g1 of the transistor, formed by the selection line $L_n$ of the row $R_n$ in the portion of this line above the channel c; and an auxiliary gate g2, formed by the portion of the storage capacitor bus $B_n$, below in the case of FIG. 5. This second gate g2 is therefore driven by the signal of row $L_{n-1}$.

Figure 6:
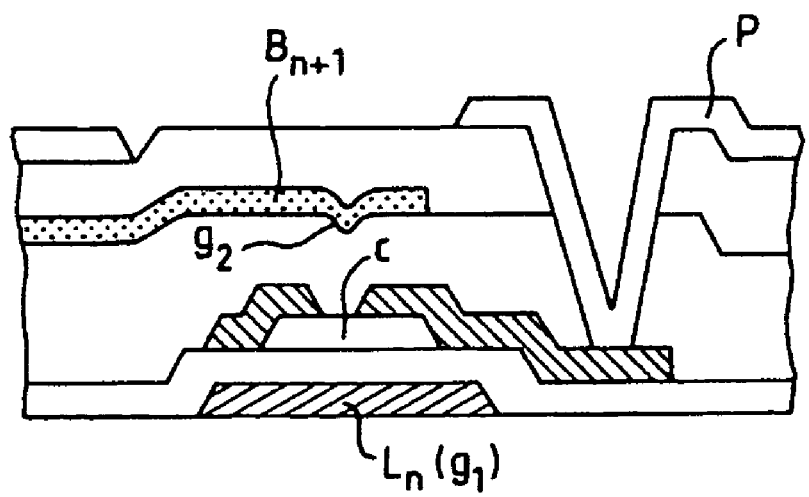

FIG. 6 illustrates another variant embodiment of a second gate which uses the storage capacitor bus of the next row: the second gate of the transistors T of a row $R_n$ is formed with the storage capacitor bus $B_{n+1}$ of the next row. In the example represented, in this figure, the transistor is of the type with gate below. The main gate g1 of the transistor is formed by the selection line $L_n$ of the row $R_n$ in the portion of this line above the channel c; and the auxiliary gate g2 is formed by the portion of the storage capacitor bus $B_{+1}$, above the channel c. This second gate g2 is here driven by the signal of row $L_n$.

The two alternative embodiments of the second gate, with the bus of the row (FIG. 5) or with the bus of the next row (FIG. 6) each apply equally well to transistors with gate below or above.

Returning to the alternative embodiment of FIG. 5, provision is made, in order to produce the overhang of the storage capacitor bus $B_n$ over the selection line $L_n$ of the associated row $R_n$, for the bus $B_n$ to be shaped so as to partly overlap at least the channel zone of each transistor of row $R_n$. In the example represented in FIG. 7, the storage capacitor bus $B_n$ thus comprises a downward vertical protuberance V at the level of each transistor. This protuberance has a boot shape corresponding to the mesa 8 (FIG. 3a), so as to overlap the entire channel. It is therefore necessary to provide a corresponding recess E in the shape of the next bus $B_{n+1}$, so as to avoid the short-circuits between the two buses $B_n$ and $B_{n+1}$.

This problem can be avoided by making provision to form a gate only on a part of the channel, for example with a protuberance overlapping only half the length of mesa, in the vertical direction. On the other hand, the blocking effects will be diminished, and there will be less good voltage holding of the second gate thus formed. In all cases, the shape of the bus is determined so as to take account of possible misalignments of the masks.

Figure 7:
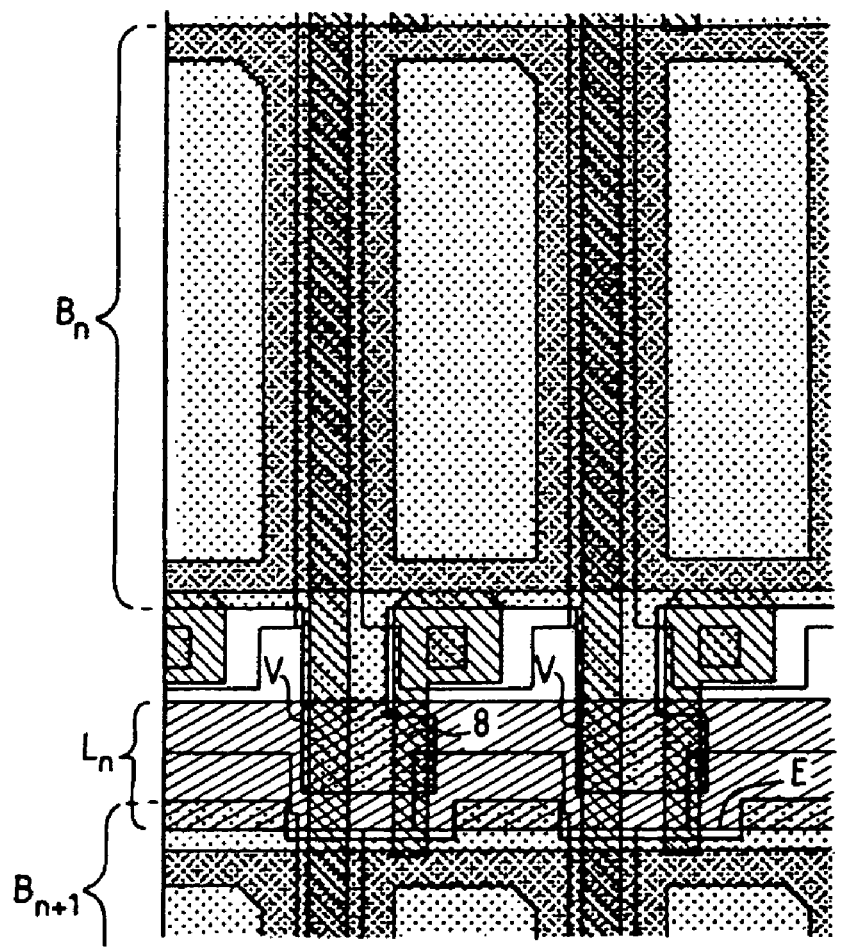
FIG. 7 shows an exemplary arrangement of a storage bus shaped to produce this second gate.

In the case of FIG. 6, where the second gate is formed with the storage capacitor bus of the next row, the bus $B_{n+1}$ is for example shaped with a protuberance corresponding to that shown in FIG. 7, but upwards. The bus $B_n$ being distant, here there is no problem of short-circuit between the buses $B_n$ and $B_{n+1}$.

Figure 8:
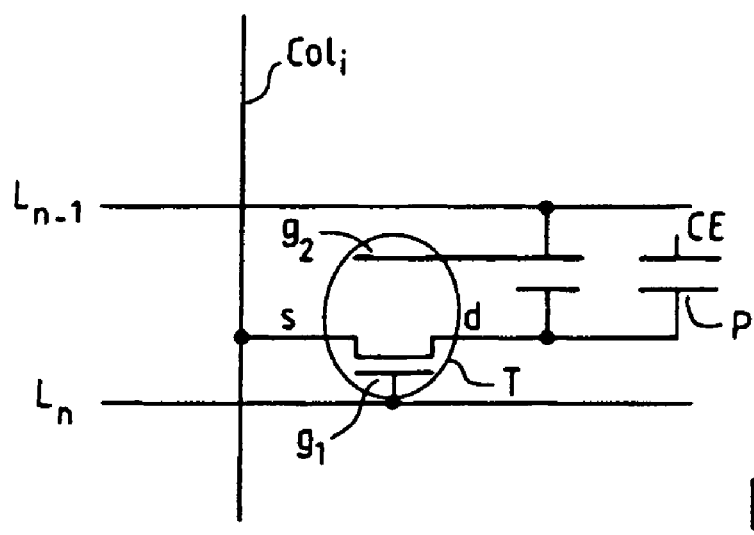
FIG. 8 is an electrical layout of a corresponding pixel element.

FIG. 8 is an electrical layout corresponding to a pixel element with transistor with double gate according to the invention in the alternative embodiment illustrated in FIGS. 5 and 7.

An advantage of a double gate transistor structure according to the invention, is to be able to strengthen the level of gate blocking of the transistors of each row, so that the selection line which drives the storage capacitor bus which forms the second gate is not selected. The optical quality is improved.

In the case where this gate is formed with the storage capacitor bus $B_n$ of row $R_n$ itself, and hence driven by the previous row selection line $L_{n-1}$ (FIGS. 5, 7, 8), this matrix structure with double gate transistors furthermore makes it possible to benefit from a gate precharging effect, which improves the matrix access time. The technical effect is a start of precharging of gate of the transistors of the row $R_n$, when the selection line which drives the storage bus of this row is selected.

To obtain such a precharge effect, it is however necessary to take account of the mode of addressing of the screen in which the matrix will be integrated. This is because, depending on the type of application considered, the polarity of the voltage applied as selection signal to the gates of the transistors may vary from frame to frame and/or from line to line. Now, it is only possible to have a positive effect of gate precharge if the selection line which drives the storage capacitor bus of the row considered is driven with the same polarity as the selection line of this row. The rank of the previous row to be connected to the storage capacitor bus of the row of rank n in the matrix must then be determined as a function of the mode of addressing of the display screen in which the matrix is to operate.

In the case where the polarity is unchanged in a frame, there are no problems. Thus, the storage capacitor bus may be driven with the immediately preceding selection line: $B_n$ is driven by $L_{n-1}$, as described previously. We have this same connection logic in the case where the polarity is inverted only from frame to frame: in a frame, the polarity is positive (+6 volts), in the next frame, the polarity is negative (−6 volts) and so on and so forth.

In fact, the connection logic changes as soon as the polarity of the lines changes within one and the same frame.

Two modes of addressing of this type are chiefly found: the line inversion mode, suitable for color screens with a so-called "stripe" type color filter structure and the double line inversion mode, suitable for color screens with a so-called "quad" type color filter structure.

Figure 9:
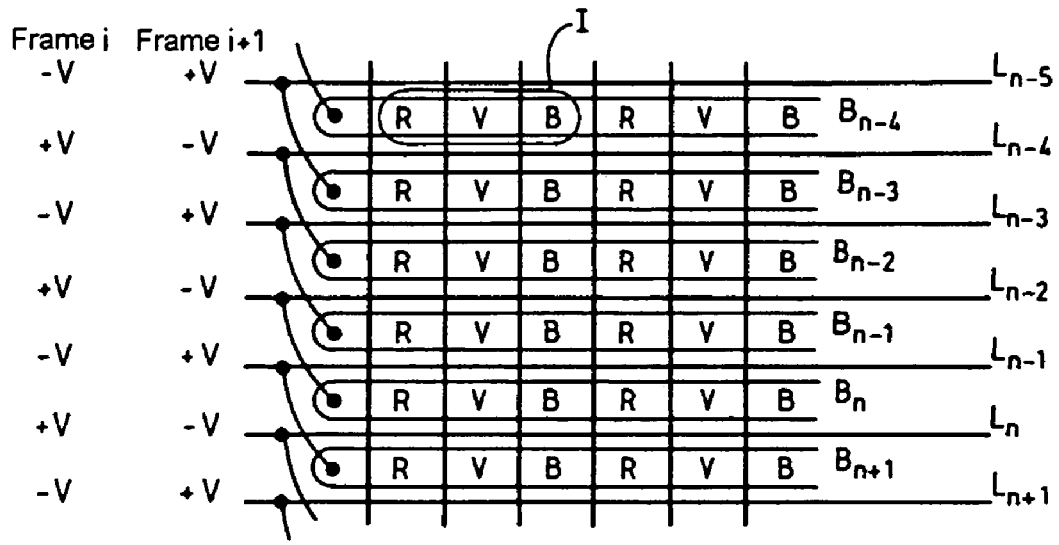
FIGS. 9 and 10 illustrate advantageous modes of connecting the storage capacitor buses to previous selection lines, determined as a function of the mode of addressing of the row selection lines.

FIG. 9 illustrates the case of a matrix structure for use with a stripe type filter structure: an image dot I is defined by three elementary dots situated on the same row, each dot corresponding to a color: red (R), green (V), blue (B).

For such a matrix, use is generally made of a mode of addressing involving a line inversion: during a frame i, polarities alternating from line to line are applied. At the next frame, they are inverted.

The selection lines which receive the same scan signal polarity are separated by a line.

Figure 10:
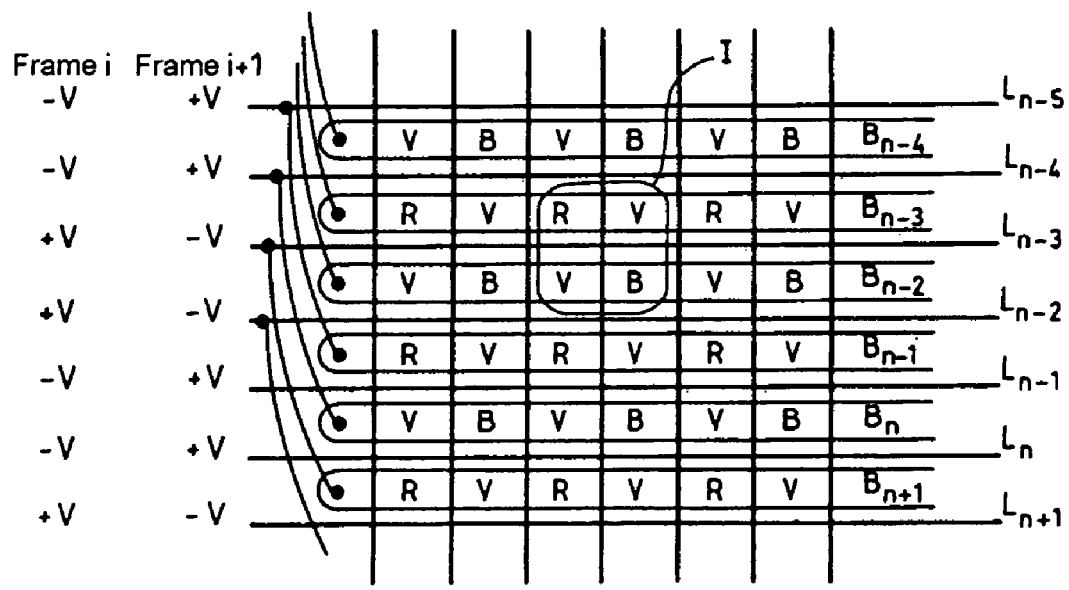

FIG. 10 illustrates the case of a matrix structure for use with a quad type filter structure: an image dot I is defined by four elementary dots aligned in two consecutive rows.

For such a matrix, use is generally made of a mode of addressing involving a double line inversion: during a frame i, polarities alternating every two lines are applied, at the next frame, they are inverted, so that all the elementary dots of one and the same image dot have one and the same polarity of gate signal. The reasoning must be made with respect to pairs of lines.

Thus, the storage capacitor bus $B_n$ of the row of rank n of the matrix is then connected to the previous selection line of rank n-4.

It will be noted that the connection principle made explicit in conjunction with FIGS. 9 and 10 applies also if the mode of addressing involves a column inversion in addition to the line or double line inversion.

With the various alternative embodiments of a matrix structure according to the invention, the fabrication yield is improved by the automatic darkening of the pixel elements short-circuited with the bus, 99% of the frame scan time (i.e., when the selection line which drives this bus is not selected).

Figure 11:
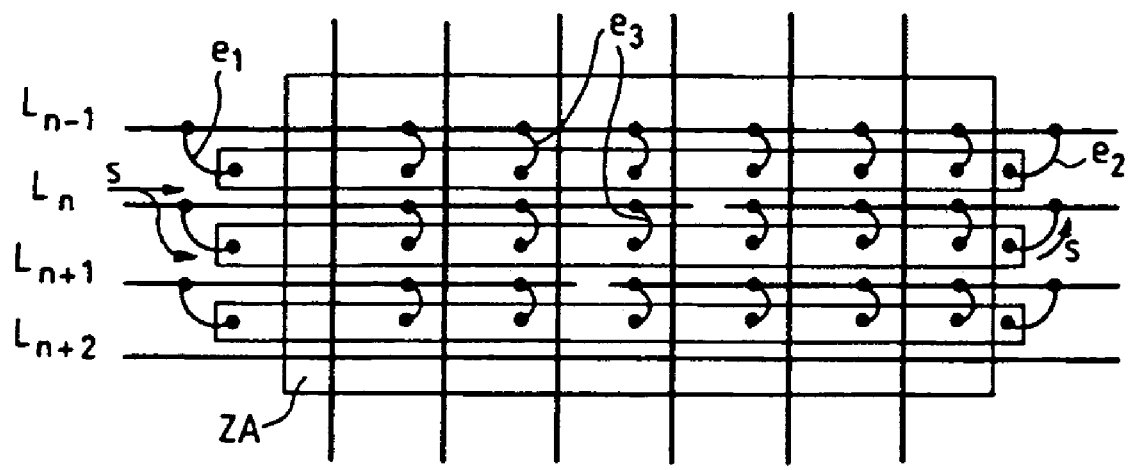
FIG. 11 illustrates the possibilities of self-repair with a storage bus according to the invention, connected at at least its two ends to a previous row selection line.

The fabrication yield may be further improved by making provision for the connection of the storage buses to the determined previous selection line, to be done outside the active zone of the matrix, at the two ends e1 and e2 of the storage capacitor bus as represented diagrammatically in FIG. 11.

Specifically, the selection (or scan) signal s for row $R_{n-1}$ is then brought by the two sides of the selection line $L_{n-1}$, on one side, by direct application to this line by the drive device of the lines, and on the other, by the storage capacitor bus, by its end e2.

If the selection line $L_{n-1}$ is open, due to a fabrication defect, this signal s is however brought to each pixel element of the row. The fabrication yield is thus improved.

Moreover the possible short-circuits between a storage capacitor bus and a selection line are no longer troublesome in this structure, since by construction, they convey the same electrical signal. In fact they help to decrease the access resistance of the storage bus.

By connecting the storage capacitor bus to the previous selection line at each pixel electrode, it is possible to resolve the case where the same line is open at several points. This also compensates for the effects of access resistance of the storage capacitor bus, due to the material used, which is not favorable to fast propagation of the signal, in the case of a break in the line.

It will be noted that this latter connection alternative is not easily applicable in the case where the previous selection line to which the storage capacitor bus must be connected is not the immediately preceding one: stated otherwise, in the case where the one series benefit from the advantages of gate precharging with a double gate structure, in line or double line inversion mode, the storage capacitor bus will no longer be connected at each pixel electrode, but only at its ends e1 and e2. In this case, the double-layer structure ITO 4 and titanium (light shield) 3 as illustrated in particular in FIG. 3b will preferably be chosen, the low resistance of the titanium layer 3 making it possible to lower the global resistance of the bus.

The matrix structure according to the invention, with its various alternative embodiments applies to the various types of thin film transistors, using amorphous, single-crystal or polycrystalline silicon. For the variants which do not relate to the very structure of the transistor, it applies to any switching device used in the field of active matrices.

This matrix structure applies to display screens which use liquid crystals, but also other materials or electrooptical structures such as OLEDs.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalents thereof.

The invention claimed is:

1. An active matrix structure for a display screen, formed on a transparent substrate, comprising:
    pixel electrodes arranged in rows and columns;
    a switching device associated with each electrode, and corresponding row selection lines, each selection line being disposed between two rows of successive pixel electrodes, said selection lines and electrode pixels being realized on a different level of a structure;
    under each row of pixel electrodes, a bus made of conducting and transparent material, substantially with a same width as said row, produced on a level of the structure separated from a level of the selection lines and from a level of the pixel electrodes by at least one insulation layer and connected to the selection line of a previous row of pixel electrodes, said bus forming a storage capacitor with each pixel electrode of said row; and a channel level of the transistors is situated between a level of the storage capacitor bus and that of the row selection lines forming gate of the transistors.

2. The active matrix structure as claimed in claim 1, wherein each storage capacitor bus is connected to a previous row selection line outside an active zone of the matrix, at at least one end.

3. The active matrix structure as claimed in claim 2, wherein each storage capacitor bus is connected at its two ends to said previous row selection line, outside the active zone.

4. The active matrix structure as claimed in claim 1, wherein each storage capacitor bus is connected to said row selection line at the level of each pixel element of the associated row.

5. The active matrix structure as claimed in claim 1, wherein the switching devices are transistors, the selection line of a row forming a gate for each of the transistors of the row.

6. The active matrix structure as claimed in claim 5, wherein for each transistor of a row, a portion at least of the storage capacitor bus of the following row overlaps the channel of the transistor, said portion of bus operating as a second gate for said transistor.

7. The active matrix structure as claimed in claim 6, for a transistor of type with a gate below, wherein the storage capacitor bus is produced on a level disposed above the levels of the selection lines and the data lines.

8. A display screen comprising an active matrix structure as claimed in claim 7.

9. The active matrix structure as claimed in claim 6, for a transistor of type with a gate above, wherein the storage capacitor bus is produced on a level disposed below the levels of the selection lines and the data lines, directly on a substrate, or on an optical mask level.

10. A display screen comprising an active matrix structure as claimed in claim 9.

11. The active matrix structure as claimed in claim 5, wherein for each transistor of a row, a portion at least of the storage capacitor bus of the row overlaps the channel of the transistor, said portion of bus operating as a second gate for said transistor.

12. The active matrix structure as claimed in claim 11, wherein the storage capacitor bus (Rn) of a row (Rn) of rank n in the matrix is connected to a previous row selection line, the rank of said previous row being determined as a function of a mode of addressing of the display screen in which the matrix must operate.

13. The active matrix structure as claimed in claim 12, wherein for a mode of addressing involving a line inversion, the storage capacitor bus of the row of rank n is connected to the selection line of the row of rank n-2.

14. The active matrix structure as claimed in claim 12, wherein for a mode of addressing involving a double-line inversion, the storage capacitor bus of the row of rank n is connected to the selection line of the row of rank n-4.

15. The active matrix structure as claimed in claim 5, for a transistor of type with a gate below, wherein the storage capacitor bus is produced on a level disposed above the levels of the selection lines and the data lines.

16. The active matrix structure as claimed in claim 5, for a transistor of type with a gate above, wherein the storage capacitor bus is produced on a level disposed below the levels of the selection lines and the data lines, directly on a substrate, or on an optical mask level.

17. A display screen comprising an active matrix structure as claimed in claim 1.

18. The display screen as claimed in claim 17, wherein the switching devices are transistors, the selection line of a row forming gate for each of the transistors of the row, and wherein the row selection lines are driven by a line addressing signal of a pulse type having plural voltage levels.

* * * * *